United States Patent [19]

Kim et al.

[11] Patent Number: 5,379,971
[45] Date of Patent: Jan. 10, 1995

[54] EMERGENCY POWER SYSTEM FOR DOOR

[75] Inventors: Sun G. Kim, Redmond, Wash.;
Donald K. Franklin, Tulsa, Okla.;
Michael P. Conner, Danville, Vt.

[73] Assignee: The Boeing Company, Seattle, Wash.

[21] Appl. No.: 172,606

[22] Filed: Dec. 22, 1993

[51] Int. Cl.6 ............................................... B64C 1/14
[52] U.S. Cl. .................................... 244/129.5; 49/139; 49/216
[58] Field of Search ............... 244/129.5; 49/139, 211, 49/214, 216, 212, 265, 334, 349, 352, 137; 92/137, 29

[56] References Cited

U.S. PATENT DOCUMENTS

| | | | |
|---|---|---|---|
| 2,432,799 | 12/1947 | Rappl | 49/349 |
| 2,524,271 | 10/1950 | Rappl | 92/14 |
| 2,524,714 | 10/1950 | Rappl | 74/625 |
| 2,864,342 | 12/1958 | Ziegelmeyer | 91/318 |
| 3,451,669 | 6/1969 | Swezey | 271/26 |
| 3,940,887 | 3/1976 | Slaybaugh | 49/137 |
| 4,607,812 | 8/1986 | De Haan et al. | 244/129.5 |
| 5,289,615 | 3/1994 | Banks et al. | 244/129.5 |

Primary Examiner—Michael S. Huppert
Assistant Examiner—Anne E. Bidwell
Attorney, Agent, or Firm—Joan H. pauly

[57] ABSTRACT

A hinge arm (16) has opposite ends (18, 20) pivotably connected to an aircraft door (2) and a door frame (8). First and second sprockets (22, 26) are fixed to the door (2) and frame (8) adjacent to the ends (18, 20). A programming chain (30) extends around the sprockets (22, 26) and the arm (16). A linear motor (36) is mounted on the arm (16) in-line with the chain (30). When pressurized gas is supplied to the motor (36), it moves the chain (30) to open the door (2) and maintain it parallel to its closed position as it moves toward and into its fully open position. The door (2) may be opened manually without moving the motor piston (44) because the motor rod (52) slides freely through an axial opening (46) in the piston (44).

14 Claims, 6 Drawing Sheets

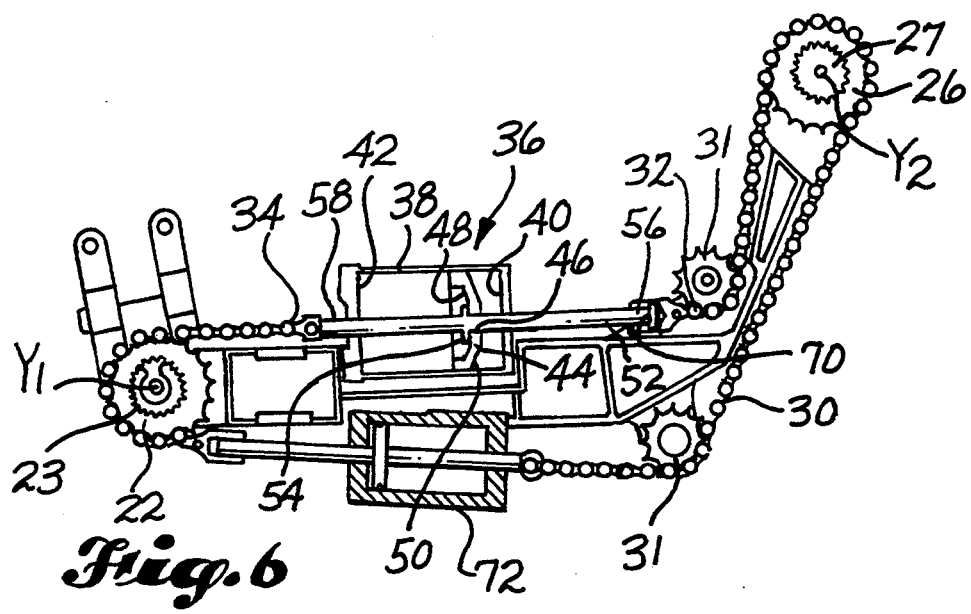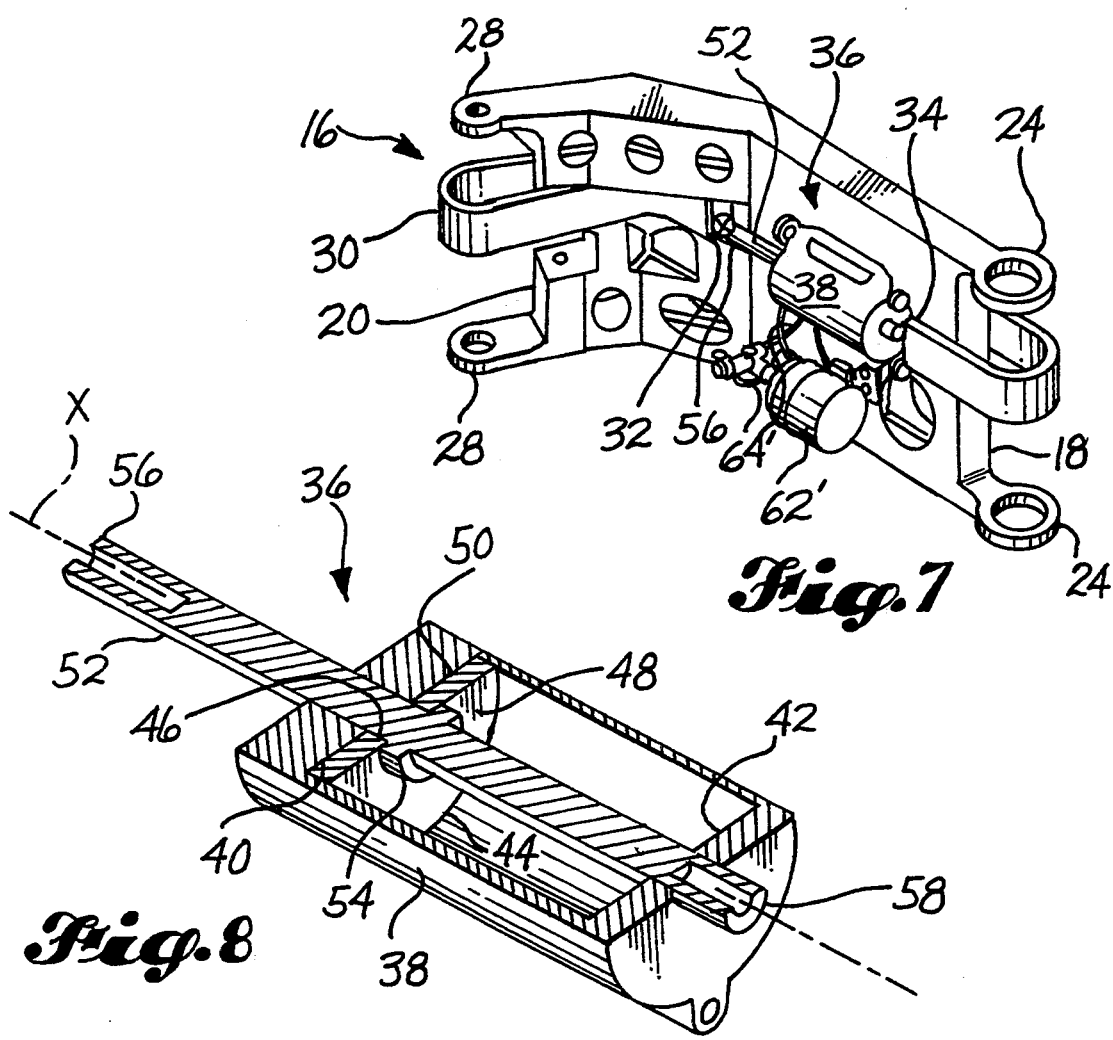

EMERGENCY POWER SYSTEM FOR DOOR

TECHNICAL FIELD

This invention relates to power systems for moving doors and, more particularly, to such a system in which a hinge arm connects and pivots relative to a door and a door frame, a chain extends around the hinge arm about fixed sprockets on the door and door frame to maintain the door parallel to the surrounding structure, and a linear motor is operable to open the door in an emergency and to permit manual opening of the door with relative sliding of a rod relative to a piston in non-emergency situations.

BACKGROUND OF THE INVENTION

Modern commercial aircraft typically have a number of doors that require opening for emergency evacuation and in non-emergency situations, such as normal passenger entry and exit and routine servicing and maintenance. It is desirable to maximize the speed and ease of the opening of the door for emergency evacuation. In some aircraft, the doors are always opened manually. Counter-balance springs may be provided to assist the manual opening. Another approach that has been used is to provide powered door opening. This generally achieves greater ease and speed of opening in an emergency situation, but known powered door systems have a number of drawbacks. These drawbacks include relative complexity and number of parts, high maintenance requirements, weight, and lack of flexibility. In addition, known systems may not provide outward and sideward door movement in which the door remains parallel to the fuselage so that, in a fully open position, it allows maximum use of the door opening for emergency egress. In known powered doors, high pressure gas is usually the energy source and is applied by means of an actuator that is either rotary or linear. The linkage between the door and door frame may be a direct bolted linkage, a rigid adjustable rod, a chain and sprocket, or a helical cam. In known systems, each of these types of linkage is a system separate from the other door mechanisms.

SUMMARY OF THE INVENTION

According to an aspect of the invention, a system for providing powered movement of a door comprises first and second sprockets, a chain, and a linear motor. The first and second sprockets are fixed to the door and an adjacent door frame, respectively. The chain extends around the sprockets and has opposite ends. The linear motor is mounted between the opposite ends of the chain. The motor comprises a cylinder defining a motor axis and having opposite end walls. A piston is positioned in the cylinder to slide axially therein and has an axial opening therethrough. A rod extends axially through the cylinder and the opening in the piston. The rod has an abutment confronting a first face of the piston. The opposite ends of the rod are connected to the opposite ends of the chain. The motor is operable to move the piston against the abutment and from a position closely adjacent to one of the cylinder end walls to a position closely adjacent to the other cylinder end wall when fluid pressure is introduced into the cylinder opposite the first face of the piston. This moves the rod and the chain and thereby moves the door from a first position to a second position. The motor also allows the rod to slide through the piston opening and the door to be moved from its first to its second position in response to a manual force exerted on the door in the absence of fluid pressure acting on the piston. The first and second positions of the door may be, for example, closed and fully open positions, respectively.

According to another aspect of the invention, a system for providing powered movement of a door comprises a hinge arm, first and second sprockets, a chain, and a linear motor. The hinge arm has first and second opposite ends pivotably mounted on the door and on an adjacent door frame, respectively. The first and second sprockets are fixed to the door adjacent to the first end of the hinge arm and to the door frame adjacent to the second end of the hinge arm, respectively. The chain extends around the sprockets and the hinge arm and has opposite ends. The linear motor is mounted on the hinge arm between the opposite ends of the chain. The motor comprises a cylinder defining a motor axis, a piston, and a rod. The piston positioned in the cylinder to slide axially therein and has an axial opening therethrough. The rod extends axially through the cylinder and the opening in the piston. The rod has an abutment confronting a first face of the piston and opposite ends connected to the opposite ends of the chain. The motor is operable to move the piston against the abutment on the rod, when fluid pressure is introduced into the cylinder opposite the first piston face, to move the rod and the chain and thereby move the door from a first position to a second position. The motor also allows manual movement of the door, as described above.

Preferably, the door remains at least substantially parallel to a wall of a structure that includes the door frame as the door moves from its first position to its second position. This feature is particularly advantageous when the first and second positions are closed and fully open positions, respectively, and the door must be available for emergency egress. Also preferably, the hinge arm pivots relative to the door and the door frame about a door axis and a frame axis, respectively, and the first and second sprockets are concentric with the door axis and the frame axis, respectively.

According to still another aspect of the invention, a system for providing powered opening of an aircraft door comprises a hinge arm, first and second sprockets, a chain, and a linear motor, as described above. The motor is operable to move the piston against the rod abutment and thereby move the door from a closed position to a fully open position. The motor also allows the rod to slide through the piston opening and the door to be moved from its closed position to its open position in response to a manual force exerted on the door in the absence of fluid pressure acting on the piston. The door preferably remains substantially parallel to an outer surface of the aircraft fuselage when it is opened.

The invention has a number of advantages. It provides a simple, low cost, lightweight method of power opening passenger doors for emergency evacuation of an airplane. It also allows manual opening of the door for normal passenger entry and exit and routine servicing and maintenance activities, and manual closing of the door. The apparatus of the invention has relatively few parts. It is easily accessible for servicing and, thus, helps minimize maintenance effort and expense. The mechanism is very versatile and may be used on either right-hand or left-hand doors without alteration. The powered operation of the door is highly reliable and does not require any apparatus that would inhibit or complicate manual opening and closing of the door. Finally, the invention is especially well-suited to door arrangements in which the door remains parallel to the main structure as it is opened.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 6 is a plan view of the programming chain and associated sprockets, linear motor, and snubber shown in FIGS. 1, 2, 4, and 5.

FIG. 7 is a schematic pictorial view of an earlier embodiment showing the hinge arm, programming chain, and linear motor.

FIG. 8 is a schematic sectioned pictorial view of the preferred embodiment of the linear motor.

BEST MODE FOR CARRYING OUT THE INVENTION

Figure 1:
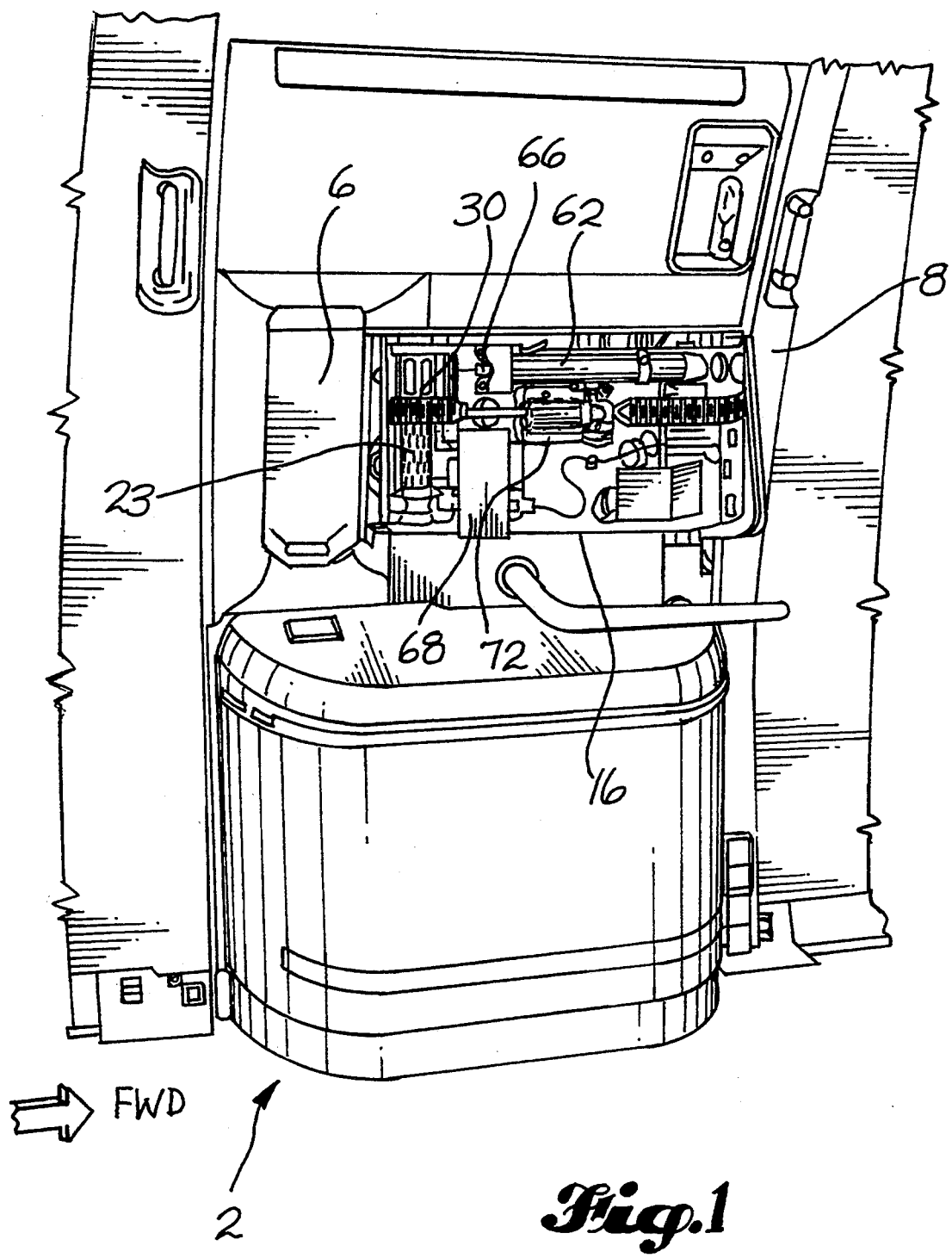
FIG. 1 is a pictorial view of an aircraft door and surrounding structure constructed in accordance with the preferred embodiment of the invention.

The drawings illustrate a system for providing powered movement of a door that is constructed according to the invention and constitutes the best mode for carrying out the invention currently known to the applicants. As shown in the drawings, the system provides powered opening of an aircraft door in a manner that maintains the door parallel to the aircraft fuselage as the door is opened. It is anticipated that this will be the primary application of the invention. However, it is intended to be understood that the invention may also be used to advantage in environments other than the aircraft environment and in connection with other types of door movement pathways.

Figure 3:
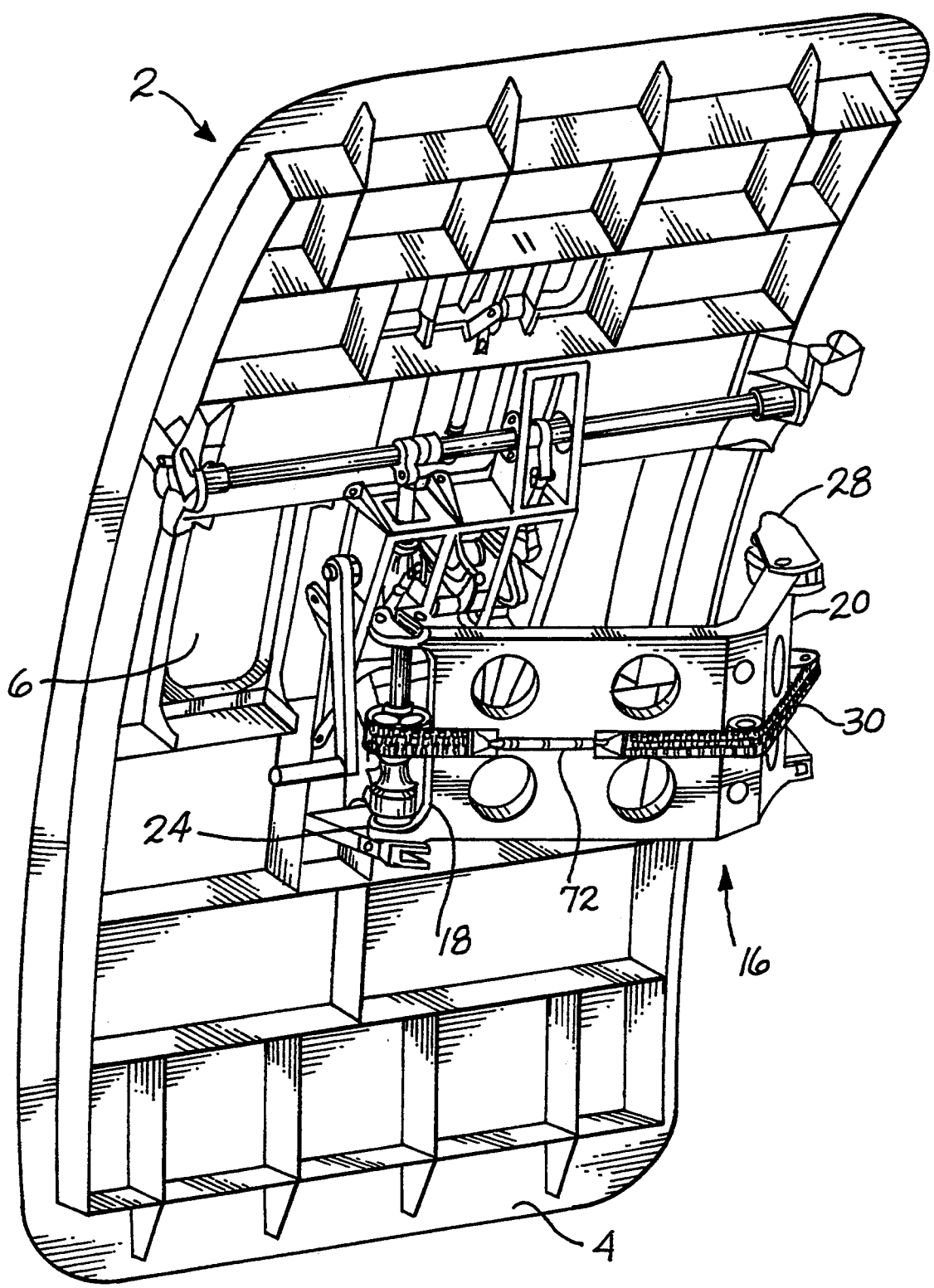
FIG. 3 is a schematic pictorial view of an earlier embodiment of the door with the associated hinge arm and powered operating mechanism.
Figure 4:
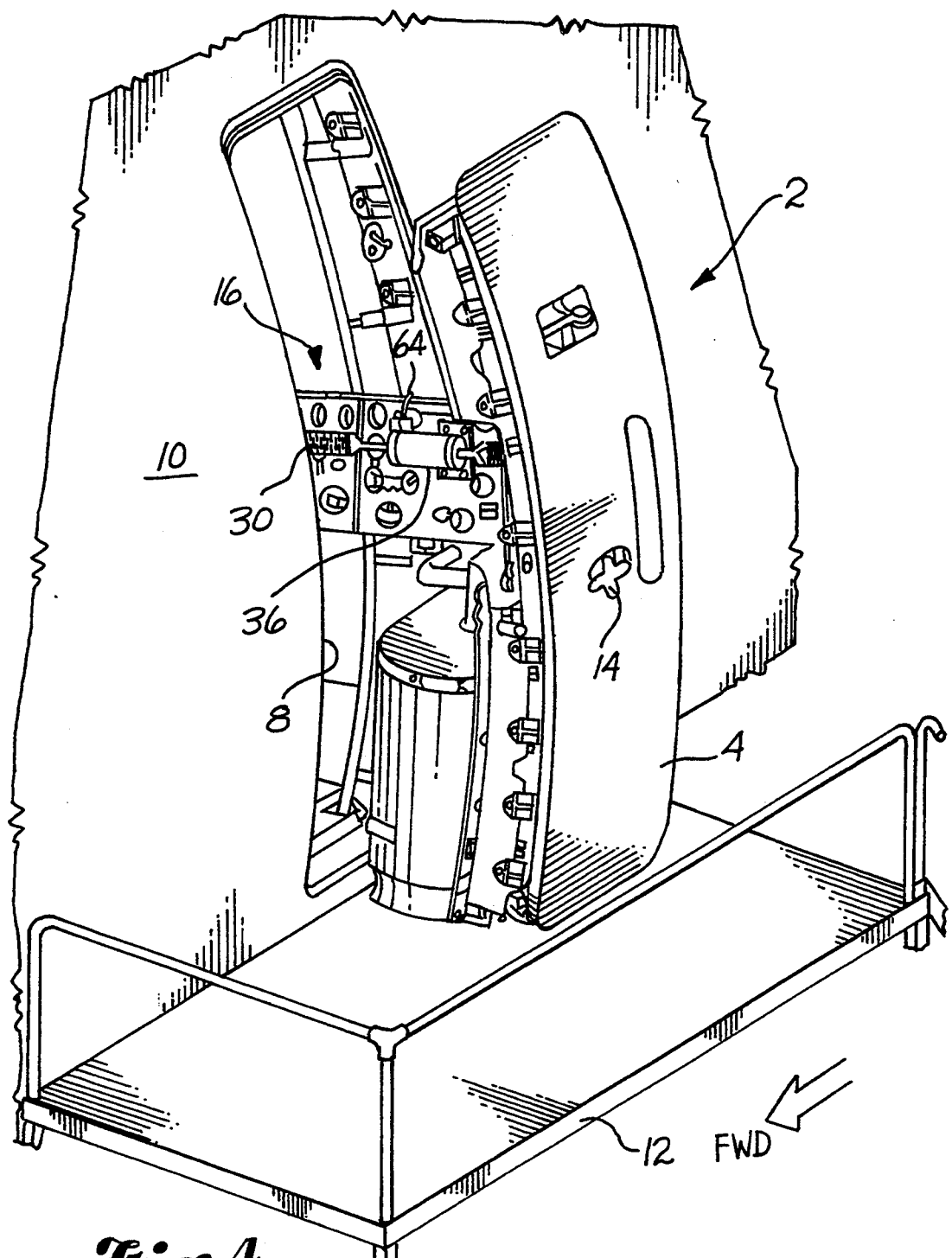
FIG. 4 is a pictorial view from the outside of the aircraft illustrating a partially open position of the door shown in FIGS. 1 and 2.
Figure 5:
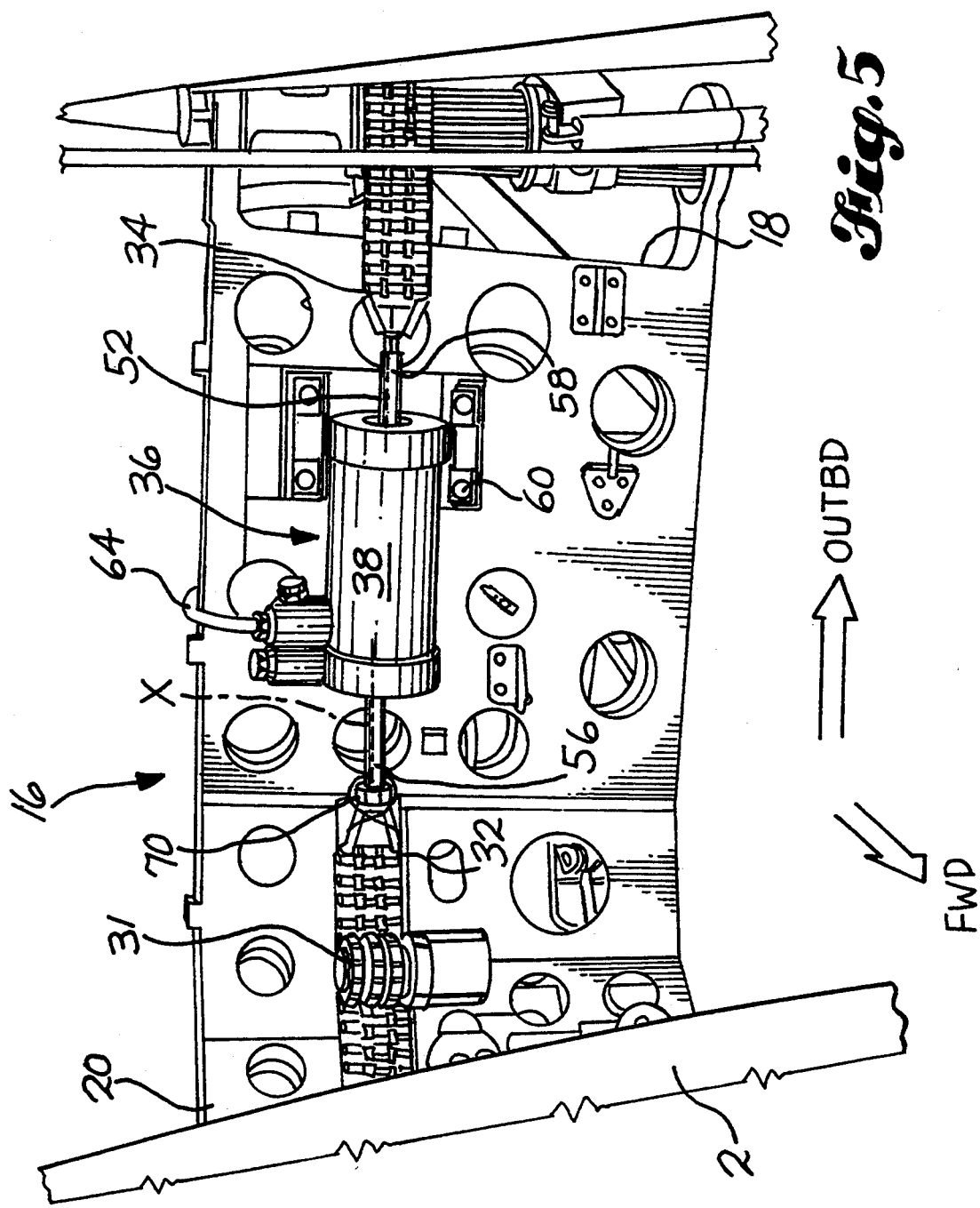
FIG. 5 is an enlarged pictorial view of the hinge arm shown in FIG. 4.

Referring to FIGS. 1, 3, and 4, the aircraft door 2 is mounted on a door frame 8 to close an opening in the aircraft fuselage 10. The door 2 has an outer skin 4 and a window 6 adjacent to the aft edge of the door 2. FIG. 4 illustrates the use of a boarding platform 12 to gain access to the aircraft cabin for maintenance purposes. An opening in the outer skin 4 in which a manual handle 14 is positioned is provided for this purpose.

The system of the invention provides powered opening of the door 2 for emergency egress from the passenger cabin and allows manual operation of the door to open and close it for non-emergency use and to close it following an evacuation. The system comprises a hinge arm 16 having first and second opposite ends 18, 20. The first end 18 is pivotably mounted on the door 2. The second end 20 is pivotably mounted to the adjacent door frame 8. The mounting of the ends 18, 20 is accomplished by means of cylindrical hinge pins 23, 27 that engage hinge lugs 24, 28 on the hinge arm 16 and corresponding lugs on the door 2 and the frame 8. As shown in the drawings, the first end 18 of the hinge arm 16 engages the door 2 aft of the center of the door and adjacent to the window 6. The second end 20 of the hinge arm 16 engages the forward edge of the frame 8. The mounting of the door could also be reversed, with the first end of the hinge arm engaging the door forward of its center and the second end engaging the aft edge of the frame 8.

Referring to FIG. 6, the mechanism for powering and controlling movement of the door includes a first sprocket 22 fixed to the door 2 adjacent to the first end 18 of the hinge arm 16. The sprocket 22 is coaxial with the axis $Y_1$ about which the door 2 pivots relative to the hinge arm 16. The hinge pin 23 is provided with longitudinally extending teeth to prevent movement of the sprocket 22 relative to the pin 23 and of the pin 23 relative to the door 2. A second sprocket 26 is positioned at the door frame 8 and fixed relative thereto adjacent to the second end 20 of the hinge arm 16. This sprocket 26 is coaxial with the axis $Y_2$ about which the hinge arm 16 pivots relative to the frame 8. The hinge pin 27 is provided with longitudinal teeth in the same manner as the pin 23 to prevent movement of the sprocket 26 relative to the pin 27 and movement of the pin 27 relative to the frame 8.

Figure 2:
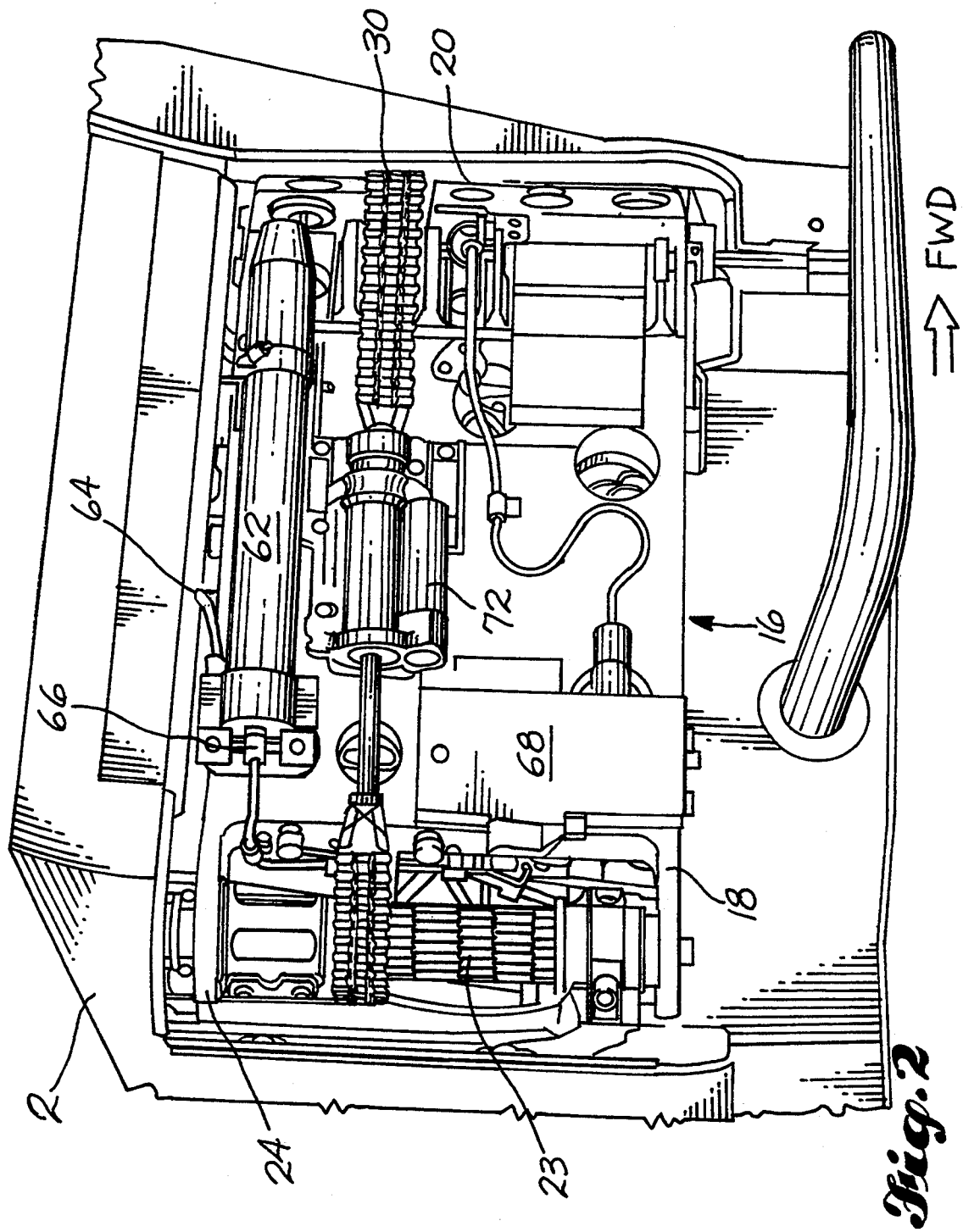
FIG. 2 is an enlarged pictorial view of the door operating mechanism shown in FIG. 1.

The actuating and control mechanism also includes a programming chain 30 that extends around the sprockets 22, 26 and around the hinge arm 16. As shown, the chain 30 is formed by a multi-strand chain. The chain 30 has opposite ends 32, 34. A linear motor 36 is mounted on the hinge arm 16 between these opposite ends 32, 34, as shown in FIGS. 4–7. A snubber 72 is mounted on the opposite side of the hinge arm 16, as shown in FIGS. 1–3. Both the motor 36 and the snubber 72 are mounted in-line with the chain 30 so that together the chain 30, the motor 36, and the snubber 72 form an endless drive chain. The chain 30 moves around the hinge arm 16. Guide sprockets 31 keep the chain 30 properly positioned to be slightly spaced from and follow the contour of the hinge arm 16.

Referring to FIGS. 4–8 and especially FIGS. 6 and 8, the motor 36 comprises a pneumatic cylinder 38 having opposite end walls 40, 42. A piston 44 is positioned in the cylinder 38 to slide therein along a motor axis X. The piston 44 has a center axial opening 46 extending therethrough between the opposite faces 48, 50 of the piston 44. The motor 36 also includes a rod 52 that extends axially through the cylinder 38 and the opening 46 in the piston 44. The rod 52 has an abutment 54 fixed thereon which confronts the first face 48 of the piston 44. The opposite ends 56, 58 of the rod 52 are connected to the opposite ends 32, 34 of the programming chain 30 to position the motor 36 in-line with the chain 30. The cylinder 38 is secured to the hinge arm 16 by means of four mounting bolts 60. A turnbuckle 70 is positioned at the connection between rod end 56 and the chain 30 to provide the correct tensioning in the chain 30 and thereby allow the door 2 to be positioned for proper closing.

The door operating mechanism includes a reservoir 62 that provides pressurized gas to the cylinder 38 when powered opening of the door 2 is desired for emergency egress or testing. The preferred long slender configuration of the reservoir 62 and its positioning on the inboardly facing side of the hinge arm 16 above the snubber 72 is illustrated in FIGS. 1 and 2. A previous less desired configuration and positioning of the reservoir is shown in FIG. 7. Referring to FIGS. 1, 2, 4, and 5, a pneumatic line 64 extends from the reservoir 62 to the motor 36 around the top edge of the hinge arm 16. As shown in FIG. 7, the reservoir 62' is short and wide and is positioned below the motor 36. A pneumatic line 64' extends from the reservoir 62' to the motor 36.

For emergency operation of the motor 36 to open the door 2, a simple mechanism, such as a lever, is operated to energize a valve 66 carried by the reservoir 62. The valve 66 is powered by a battery 68 on the inboardly facing side of the hinge arm 16 below and aft of the snubber 72. Pressurized gas flows from the reservoir 62 through the open valve 66 and the line 64 into the cylinder 38 between the cylinder end wall 40 and the second face 50 of the piston 44. Since the piston 44 is closely adjacent to the end wall 40 when the door 2 is in its closed position, the introduction of pressurized gas into the cylinder 38 moves the piston 44 against the abutment 54 on the rod 52. The piston 44 moves from its position closely adjacent to the end wall 40 to a position closely adjacent to the other end wall 42. The engagement of the first piston face 48 against the rod abutment 54 causes corresponding movement of the rod 52. Since the rod 52 is positioned in-line with the chain 30, the chain 30 also moves to thereby move the door from its closed position shown in FIG. 1 to a fully open position. The door 2 may subsequently be closed manually after pressurized gas is bled off. During manual closing, the abutment 54 engages the piston face 48 to reposition the piston 44 in its position adjacent to the cylinder end wall 40. During the powered opening of the door 2, the hydraulic snubber 72 controls the rate of movement of the door 2.

The door 2 may also be opened manually in the absence of fluid pressure acting on the piston 44. A suitable lever or handle is operated to unlock and/or unlatch the door 2 and pulling or pushing manual force is exerted on the door 2 to open it. As the door 2 moves toward an open position in response to the manual force, the piston 44 remains in its position adjacent to the end wall 40 and the rod 50 slides freely through the piston opening 46. This mode of piston/rod interaction reduces friction and wear and prevents pumping action of the piston that would pull in moisture. During manual opening of the door 2, the presence of the motor 36 is effectively operationally invisible to the person opening the door 2. As in the case following a powered opening, the door 2 may subsequently be manually closed. In the case of closing following a manual opening, the piston 44 is not repositioned since it has not moved out of its set position corresponding to the closed position of the door 2.

The motion of the door 2 during opening and closing is such that the door 2 remains parallel to its closed position and substantially parallel to the outer surface of the fuselage 10 adjacent to the frame 8. The door motion is controlled by the interaction of the hinge arm 16, the programming chain 30, and the fixed sprockets 22, 26. During powered opening of the door 2 shown in the drawings, movement of the linear motor rod 52 causes the chain 30 to revolve around the hinge arm 16. This causes the hinge arm 16 to pivot about the door frame axis $Y_2$ and the sprocket 22 fixed to the door 2 to revolve relative to the hinge arm 16. The latter movement causes pivotal movement of the door 2 since it is fixed relative to the sprocket 22. The pivotal movement of the hinge arm 16 relative to the frame 8 and the pivotal movement of the door 2 relative to the hinge arm 16 as the door 2 opens causes the door 2 to remain parallel to its closed position. The final fully open position of the door 2 is close to the outer skin of the fuselage 10 adjacent to but substantially away from the opening in the fuselage 10. This provides the maximum possible opening in the fuselage and an unobstructed area outside the fuselage for emergency egress.

As described above, during powered opening of the door 2, movement of the chain 30 causes movement of the door 2. During manual opening of the door 2, movement of the door 2 causes movement of the chain 30 around the hinge arm 16. This causes the relative pivotal movements between the hinge arm 16 and the frame 8 and between the door 2 and the hinge arm 16 described above. When the door 2 is closed, movement of the door again translates the chain 30 around the hinge arm 16 but in the opposite direction to cause opposite pivotal movements of the hinge arm 16 and the door 2 and thereby maintain the door 2 in a parallel position as it is moved from its fully open to its closed position.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A system for providing powered movement of a door, comprising:
   first and second sprockets adapted to be fixed to a door and an adjacent door frame, respectively;
   a chain extending around said sprockets and having opposite ends; and
   a fluid pressure operated linear motor mounted between said opposite ends of said chain; said motor comprising a cylinder defining a motor axis and having opposite end walls, a piston positioned in said cylinder to slide axially therein and having an axial opening therethrough, and a rod extending axially through said cylinder and said opening in said piston and having an abutment confronting a first face of said piston and opposite ends connected to said opposite ends of said chain, respectively;
   said motor being operable to move said piston against said abutment and from a position closely adjacent to one of said end walls to a position closely adjacent to the other of said end walls, when fluid pressure is introduced into said cylinder opposite said first face, to move said rod and said chain and thereby move the door from a first position to a second position; and said motor allowing said rod to slide through said opening and the door to be moved from said first position to said second position in response to a manual force exerted on the door in the absence of fluid pressure acting on said piston.

2. The system of claim 1, in which said first and second positions of the door are closed and fully open positions, respectively.

3. A system for providing powered movement of a door, comprising:
   a hinge arm having first and second opposite ends adapted to be pivotably mounted on a door and an adjacent door frame, respectively;
   a first sprocket fixed to the door adjacent to said first end;

a second sprocket fixed to the door frame adjacent to said second end;

a chain extending around said sprockets and said hinge arm and having opposite ends; and a fluid pressure operated linear motor mounted on said hinge arm between said opposite ends of said chain; said motor comprising a cylinder defining a motor axis, a piston positioned in said cylinder to slide axially therein and having an axial opening therethrough, and a rod extending axially through said cylinder and said opening in said piston and having an abutment confronting a first face of said piston and opposite ends connected to said opposite ends of said chain, respectively;

said motor being operable to move said piston against said abutment, when fluid pressure is introduced into said cylinder opposite said first face, to move said rod and said chain and thereby move the door from a first position to a second position; and said motor allowing said rod to slide through said opening and the door to be moved from said first position to said second position in response to a manual force exerted on the door in the absence of fluid pressure acting on said piston.

4. The system of claim 3, in which said first and second positions of the door are closed and fully open positions, respectively.

5. The system of claim 4, in which the door frame is part of a wall of a structure, and the door remains at least substantially parallel to said wall as it moves from its first position to its second position.

6. The system of claim 5, in which said hinge arm pivots relative to the door and the door frame about a door axis and a frame axis, respectively, and said first and second sprockets are concentric with said door axis and said frame axis, respectively.

7. The system of claim 4, in which said hinge arm pivots relative to the door and the door frame about a door axis and a frame axis, respectively, and said first and second sprockets are concentric with said door axis and said frame axis, respectively.

8. The system of claim 3, in which the door frame is part of a wall of a structure, and the door remains at least substantially parallel to said wall as it moves from its first position to its second position.

9. The system of claim 8, in which said hinge arm pivots relative to the door and the door frame about a door axis and a frame axis, respectively, and said first and second sprockets are concentric with said door axis and said frame axis, respectively.

10. The system of claim 3, in which said hinge arm pivots relative to the door and the door frame about a door axis and a frame axis, respectively, and said first and second sprockets are concentric with said door axis and said frame axis, respectively.

11. A system for providing powered opening of an aircraft door, comprising:

a hinge arm having first and second opposite ends adapted to be pivotably mounted on a door and an adjacent door frame, respectively;

a first sprocket fixed to the door adjacent to said first end;

a second sprocket fixed to the door frame adjacent to said second end;

a chain extending around said sprockets and said hinge arm and having opposite ends; and a fluid pressure operated linear motor mounted on said hinge arm between said opposite ends of said chain; said motor comprising a cylinder defining a motor axis, a piston positioned in said cylinder to slide axially therein and having an axial opening therethrough, and a rod extending axially through said cylinder and said opening in said piston and having an abutment confronting a first face of said piston and opposite ends connected to said opposite ends of said chain, respectively;

said motor being operable to move said piston against said abutment, when fluid pressure is introduced into said cylinder opposite said first face, to move said rod and said chain and thereby move the door from a closed position to a fully open position; and said motor allowing said rod to slide through said opening and the door to be moved from said closed position to said open position in response to a manual force exerted on the door in the absence of fluid pressure acting on said piston.

12. The system of claim 11, in which the door frame is mounted in an aircraft fuselage, and the door remains substantially parallel to an outer surface of the fuselage as it moves from its first position to its second position.

13. The system of claim 12, in which said hinge arm pivots relative to the door and the door frame about a door axis and a frame axis, respectively, and said first and second sprockets are concentric with said door axis and said frame axis, respectively.

14. The system of claim 11, in which said hinge arm pivots relative to the door and the door frame about a door axis and a frame axis, respectively, and said first and second sprockets are concentric with said door axis and said frame axis, respectively.

* * * * *